Aug. 27, 1935.  A. G. VON SODEN-FRAUNHOFEN ET AL  2,012,292
POWER TRANSMITTING MECHANISM IN MOTOR DRIVEN VEHICLES
Filed Nov. 25, 1932   2 Sheets-Sheet 1

Inventors:

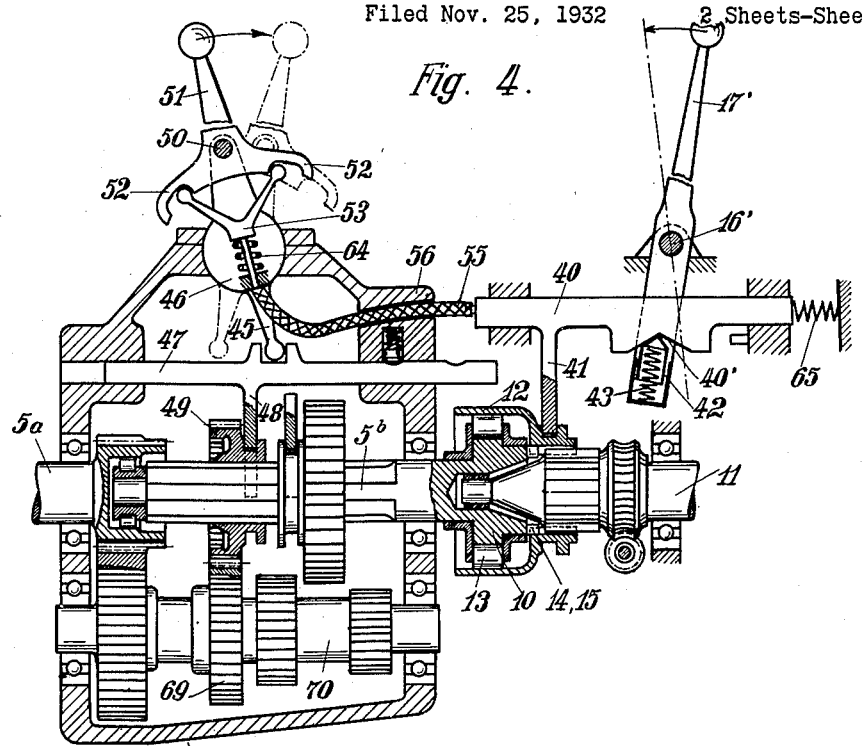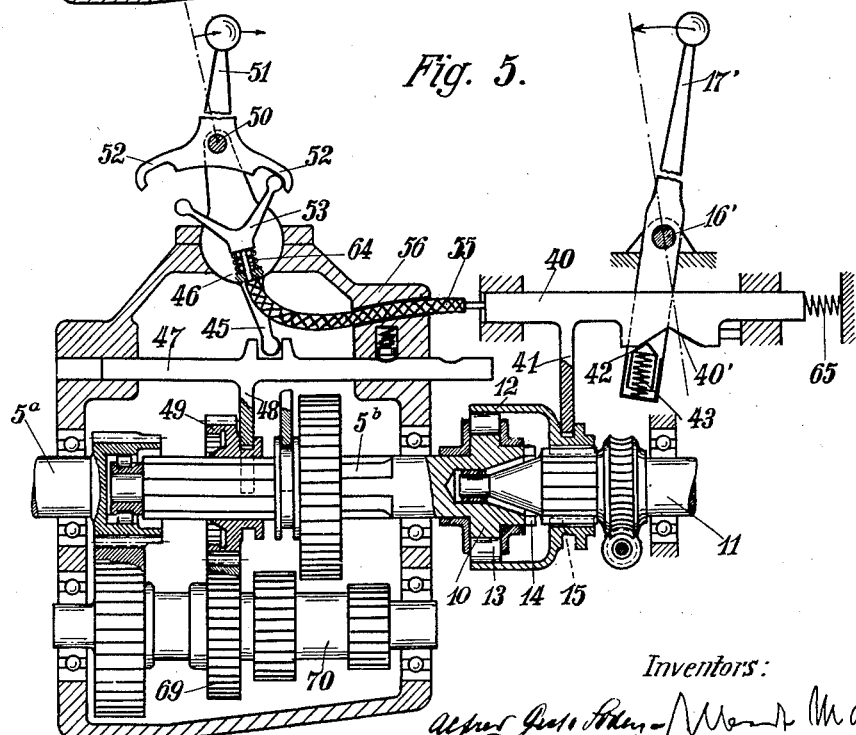

Patented Aug. 27, 1935

2,012,292

UNITED STATES PATENT OFFICE 2,012,292

POWER TRANSMITTING MECHANISM IN MOTOR DRIVEN VEHICLES

Alfred Graf von Soden-Fraunhofen and Albert Maier, Friedrichshafen, Bodensee, Germany, assignors to Zahnradfabrik Friedrichshafen Aktiengesellschaft, Friedrichshafen, Bodensee, Germany Application November 25, 1932, Serial No. 644,412
In Germany December 19, 1931

3 Claims. (Cl. 192—48)

Our invention relates to motor driven vehicles and has special reference to the power transmitting mechanism in such vehicles.

For transmitting the motor power to the wheels of the vehicle it is usual to provide a change speed gear which is connected to the motor by means of a clutch, preferably a friction clutch. This friction clutch is in engagement when the motor is driving the vehicle and by means of the change speed gear the speed of rotation of the motor is reduced before the power is led into the propeller shaft driving the wheels. There are different speeds, two or more, attainable by operating the change speed gear.

Lately a free-wheeling mechanism has been introduced which is generally inserted in the propeller shaft for the purpose of allowing the rear portion of this shaft to overrun the portion which is connected to the change speed gear. Thus it is possible on level good roads to shut the gas off and to let the vehicle run without driving power for a certain period, just as is usual with bicycles. But in certain cases, especially when going down hill, it is desirable to have again an un-interrupted connection from the wheels to the motor, for example when you want to exert a braking effect on the vehicle from the idle running motor. For this purpose a special coupling is provided adapted to be operated by the driver at his will by which the free-wheel mechanism is blocked, so that the two portions of the propeller shaft are in driving connection in both directions of rotation.

In case of a speed change it is usual to de-clutch the main friction clutch between the motor and the change speed gear. The change in speed is further facilitated by the free-wheel mechanism on the propeller shaft. But if the free-wheel mechanism is blocked this further advantage is lost.

That is why, according to our invention, we provide means connected to the operating lever of the main clutch which serve for de-blocking the free-wheel mechanism whenever the main friction clutch is de-clutched. This means, instead of being connected to the operating lever of the main clutch, may as well be connected to the operating lever of the change speed gear, causing de-blocking of the free-wheel mechanism just before a speed change is perfected.

Having given a general description of our invention we now want to point it out more in detail, referring to the drawings which represent several examples embodying our invention.

Figure 1:
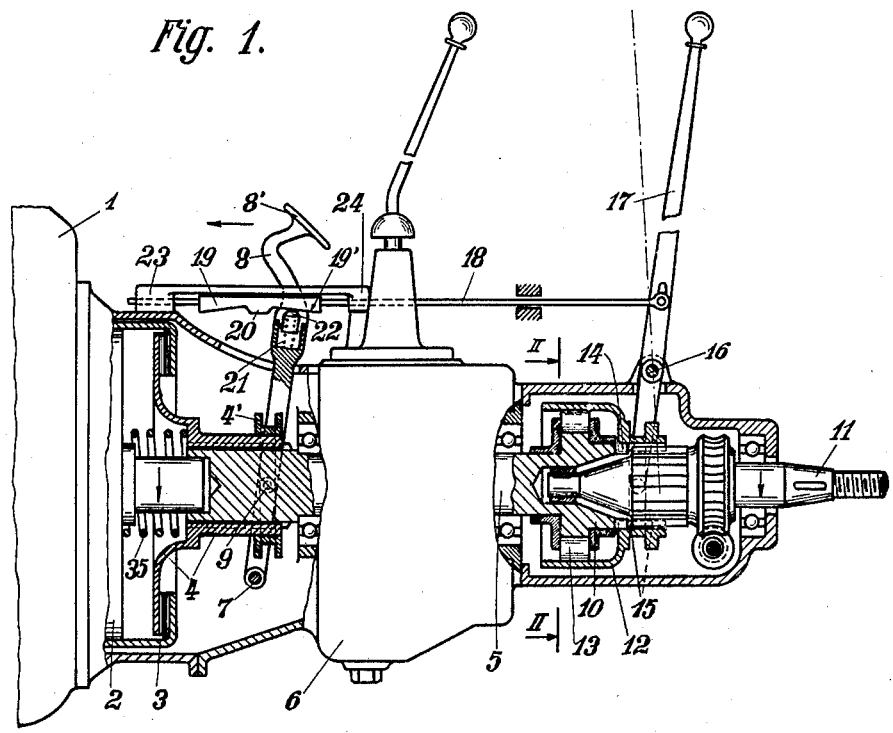
Fig. 1 is a vertical longitudinal section through the main transmission elements of a motor car, the change speed gear being represented in elevation.
Figure 2:
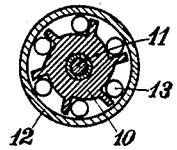
Fig. 2 is a cross section through the free-wheel mechanism, taken on line II—II of Fig. 1.

Figs. 4 and 5 relate to a third example in which the lever for operating the rear coupling for blocking the free-wheel mechanism is resiliently connected to the lever for operating the change speed gear. Fig. 4 is a vertical diagrammatical longitudinal section through a change speed gear and the free-wheel mechanism. Fig. 5 corresponds to Fig. 4, giving another position of the elements.

The motor is indicated at 1. Connected to the fly-wheel 2 is one half 3 of a friction clutch, the other half of which is member 4. These two clutch members are pressed against each other by means of spring 35. There is an annular channel 4' connected to the sleeve portion of element 4. By means of foot lever 8 journaled at 7 and having a pin or fork 9 fitting into channel 4' the friction clutch 3—4 can be disengaged against the pressure of spring 35. This is done by pushing down pedal 8' of lever 8.

The change speed gear is enclosed in case 6, the out-going shaft thereof is shown at 5. The free-wheel mechanism on this shaft comprises rollers 13 situated on member 10, which is connected to shaft 5 and of an outer member 12, which is splined to the propeller shaft 11.

Members 10 and 12 are provided with claw teeth 14 and 15, respectively, as may be seen especially from Fig. 5. But this arrangement is the same with the example represented in Fig. 1. By swinging lever 17 journaled at 16 the claw teeth 14 and 15 can be brought into and out of engagement. If they do not engage the free-wheel mechanism is operative and allows for shaft 11 to overrun shaft 5; but if the coupling 14—15 is engaged the free-wheel mechanism is blocked.

There is a rod 18 connected to lever 17. The left hand end of this rod is provided with projecting portions 19, 20 and 19'. Foot lever 8 has a member 22 which by means of spring 21 is pressed against the left hand end portion of rod 18 which is guided at 23 and 24.

If—in the position shown in Fig. 1—foot lever 8 is pushed forward in the direction of the arrow, member 22 bears against projection 20 of rod 18 and causes shifting of rod 18 to the left thus swinging lever 17 into its dotted line-position and consequently de-clutching coupling 14—15. But as the travel of foot lever 8 is greater than that of rod 18, foot lever 8 moves further to the left and member 22 passes projection 20 spring 21 being compressed. At the end of the stroke of the foot lever 8 member 22 is on the portion 19 of rod 18 at the left of projection 20, so that, when foot lever 8 is released and moves back to its original position, rod 18 on the first portion of the stroke of lever 8 is pushed back to the right and causes lever 17 to swing back again thereby engaging coupling 14—15 and blocking the free-wheel mechanism. Foot lever 8 moves further to the right, again because of its greater stroke, and member 22 passes back to the right hand side of projection 20, spring 21 being compressed. Thus the members 8, 17, 18, 19, 20 and 22 are again in their original position, as illustrated in Fig. 1.

Consequently, whenever friction clutch 3—4 is dis-engaged coupling 14—15 is disconnected also, so that an easy shifting in the change speed gear is possible. But independently of foot lever 8 coupling 14—15 can be operated at any time by the driver at his will thereby causing free-wheeling of the vehicle or blocking the free-wheel mechanism, as circumstances may afford.

Figure 3:
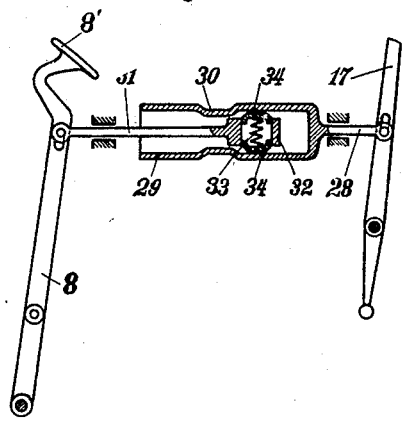
Fig. 3 represents in detail a further example for the connecting member between the main clutch operating lever and the operating lever for the rear coupling, shown in longitudinal section.

In the example represented in Fig. 3 a different connection is provided between levers 17 and 8. A cylinder 29, having a narrower middle portion 30, is connected to lever 17 by means of rod 28. Rod 31, connected to lever 8, at its end has a piston 32 situated within cylinder 29. This piston is of variable width, due to outer elements 34 which are pressed against the inner walls of cylinder 29. The function of this arrangement corresponds exactly to that of the design shown in Fig. 1 and consequently need not be explained in detail.

In Figs. 4 and 5 the change speed gear is shown in section. Shaft 5a is the in-coming shaft and 5b is the out-going shaft of the speed gear. There are gears on the shafts, and as an example only one of these gears is designated by the numeral 49. Striker rod 47 by means of arm 48 is adapted to shift gear 49, and lever 45 journaled at 46 can shift striker rod 47.

In the upper arm of lever 45 an operating lever 51 is journaled at 50 having two side arms 52. These arms 52 are adapted to co-operate with two projections of forked member 53 which is tensioned upward by means of a spring 64. A flexible element abutting with one end against forked member 53 is contained in the ropelike member 55. The other end thereof abuts against striker rod 40 having arm 41 adapted to shift member 12.

Assuming the position represented in Fig. 4 and the driver having the intention to shift gear 49 out of engagement with the corresponding gear 69 on stub shaft 70: The driver swings lever 51 from its left hand position into the dotted line position. Arm 52 of lever 51, swinging around pin 50, causes pressure on forked member 53. This member is pushed down against the pressure of spring 64 and by means of a flexible element (wire or the like) contained in the rope-like member 55 supported at 56 exerts pressure on striker rod 40 thereby causing arm 41 to move member 12 to the right and to dis-engage coupling 14—15, as indicated in Fig. 5.

Lever 17' which serves for operating striker rod 40 and coupling 14—15 independently of lever 51 need not follow the operation of lever 51. There is a resilient connection 42—43 between lever 17' and striker rod 40. But if spring 43 of this connection is strong enough lever 17' will follow because member 42 presses on the sloping surface 40' and causes the lever 17' to move into its left hand position as indicated by the arrow in Fig. 5.

On further movement of lever 51 to the right the lower portion of lever 45 is moved to the left and causes the desired dis-engagement of gear 49.

Thus, the arrangement shown in Figs. 4 and 5 on operation of lever 51 first causes dis-engagement of coupling 14—15 and functioning of the free-wheel mechanism 10—12—13, and later the desired speed change is perfected.

Of course, member 53 and spring 64 are so arranged that they may swing together with lever 45. Thus, when the change in speed was made and levers 51 and 45 are pointing again in the same direction, member 53 under the pressure of spring 64 moves upward again, thereby releasing rod 40, which returns to its left hand position by means of spring 65 and thus causes the free-wheel mechanism 10—12—13 to be blocked again as the coupling 14—15 is re-engaged.

We do not want to be limited to the details described or shown in the drawings as many variations will occur to those skilled in the art.

What we claim is:

1. In a motor vehicle in combination, a motor; a change speed gear; a clutch mechanism between said motor and said change speed gear; a lever for operating said clutch; a propeller shaft for driving the wheels of said vehicle; a free-wheel mechanism inserted in said propeller shaft allowing the rear shaft portion to overrun the shaft portion connected to said change speed gear; a coupling for directly connecting said two shaft portions; a lever for operating said coupling; and a two way yieldable lost motion connection between said latter operating lever with said lever for operating said clutch between said motor and said change speed gear adapted to cause disengagement of said coupling on the first portion of the stroke of said lever for operating said clutch and having no influence on said coupling during the further stroke portion of said clutch operating lever.

2. In a motor vehicle in combination; a change speed gear; a lever for operating said change speed gear; a propeller shaft extending from said change speed gear; a free-wheel mechanism inserted in said propeller shaft; a coupling for blocking said free-wheel mechanism; means for operating said coupling; and a yieldable lost motion connection between said lever and said means for operating said coupling adapted to cause disengagement of said coupling on the first portion of the stroke of said lever for operating said change speed gear and having no influence on said coupling during the further stroke portion of said gear operating lever.

3. In a motor vehicle in combination: a motor, a propeller shaft, and intermediate power transmitting means; a lever for operating said means, a free-wheel mechanism inserted in said propeller shaft allowing the rear shaft portion to overrun the shaft portion connected to said power transmitting means; a coupling for directly connecting said two shaft portions means for operating said coupling; and means for resiliently connecting said latter operating means with said first operating lever on said power transmitting means; said resilient connecting means comprising: a shifting element and a yieldable connection of said lever with said shifting element adapted to cause said lever and said operating means to move together over the first portion of the stroke and having no influence on the further stroke portion.

ALFRED GRAF von SODEN-
FRAUNHOFEN.
ALBERT MAIER.